(12) United States Patent
Makarow et al.

(10) Patent No.: US 10,871,215 B2
(45) Date of Patent: Dec. 22, 2020

(54) POSITIONING DEVICE AND A METHOD FOR PRODUCING THE POSITIONING DEVICE

(71) Applicant: Mahle International GmbH, Stuttgart (DE)

(72) Inventors: Eugen Makarow, Ludwigsburg (DE); Edgar Salfeld, Lichtenwald (DE); Johannes Schmidt, Nuertigen (DE); Florian Wetzel, Baltmannsweiler (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/448,999

(22) Filed: Jun. 21, 2019

(65) Prior Publication Data

US 2019/0390758 A1 Dec. 26, 2019

(30) Foreign Application Priority Data

Jun. 21, 2018 (DE) .......................... 10 2018 210 130

(51) Int. Cl.
*F16H 57/02* (2012.01)
*F16H 57/023* (2012.01)
(Continued)

(52) U.S. Cl.
CPC ... *F16H 57/02004* (2013.01); *F16H 57/0031* (2013.01); *F16H 57/022* (2013.01); *F16H 57/023* (2013.01); *F16H 2057/0221* (2013.01)

(58) Field of Classification Search
CPC ............. F16H 57/02004; F16H 57/023; F16H 57/022; F16H 57/0031; F16H 2057/0221;
(Continued)

(56) References Cited

U.S. PATENT DOCUMENTS 5,836,076 A 11/1998 Duta et al.
2008/0307913 A1 12/2008 Oberle et al.
(Continued)

FOREIGN PATENT DOCUMENTS

DE 19854594 A1 5/2000
DE 10337475 A1 3/2005
(Continued)

OTHER PUBLICATIONS

English abstract for DE10337474A1.
(Continued)

*Primary Examiner* — David J Hlavka
(74) *Attorney, Agent, or Firm* — Fishman Stewart PLLC (57) ABSTRACT

A positioning device for mechanically actuating a component may include a housing with first and second housing parts welded to one another via an axial welded connection. The first and second housing parts may have integrally formed first and second bearing points, respectively, of a bearing within the housing. The positioning device may also include a gearing fixed in the housing, the gearing having an output shaft penetrating the second housing part and being drive-connectable with the component outside the housing, and an output wheel non-rotationally fixed on the output shaft and rotatably mounted in the bearing. The positioning device may further include a rotary position detector with a permanent magnet and a Hall sensor, the permanent magnet being arranged on a gear wheel of the output shaft or on the output shaft at an end face of the output shaft, and the Hall sensor being arranged on the first housing part. End faces of the first and second bearing points may interact axially with first and second bearing surfaces, respectively, of the output wheel located opposite each other. The bearing may have a predetermined axial play defined by a difference between an outer axial distance between the first and second bearing (Continued)

points and an inner axial distance between the first and second bearing surfaces.

20 Claims, 3 Drawing Sheets

(51) Int. Cl.
  *F16H 57/022* (2012.01)
  *F16H 57/00* (2012.01)
(58) Field of Classification Search
  CPC ........ F16H 57/031; F16H 57/00; F16H 57/02; F16H 57/0018; F16H 2057/02017; B23K 31/02
  See application file for complete search history.

(56) References Cited

U.S. PATENT DOCUMENTS

| | | |
|---|---|---|
| 2011/0126653 A1 | 6/2011 | Kroner et al. |
| 2016/0160961 A1* | 6/2016 | Biro .................. H02K 5/10 74/414 |
| 2019/0173356 A1* | 6/2019 | Shirai .................. H02K 11/33 |
| 2020/0208729 A1* | 7/2020 | Tashiro ............... F16D 1/0882 |

FOREIGN PATENT DOCUMENTS

| | | |
|---|---|---|
| DE | 102004047184 A1 | 3/2006 |
| DE | 102005040647 A1 | 3/2007 |
| DE | 102005046356 A1 | 3/2007 |
| DE | 202008010921 U1 | 1/2010 |
| DE | 202008014088 U1 | 3/2010 |
| DE | 202009011844 U1 | 1/2011 |
| DE | 102010040941 A1 | 3/2011 |
| DE | 102015224535 A1 | 6/2017 |
| DE | 102015225843 A1 | 6/2017 |
| DE | 102016206954 A1 | 10/2017 |
| EP | 2175167 A1 | 4/2010 |
| WO | WO-2004/020870 A1 | 3/2004 |
| WO | WO-2017102630 A1 | 6/2017 |

OTHER PUBLICATIONS

English abstract for DE102015224535.
English abstract for DE102010040941.
English abstract for DE102005046356.
English abstract for DE102005040647.
English abstract for DE102016206954.

* cited by examiner

POSITIONING DEVICE AND A METHOD FOR PRODUCING THE POSITIONING DEVICE

CROSS-REFERENCE TO RELATED APPLICATION

This application claims priority to German Patent Application No. DE102018210130.2, filed Jun. 21, 2018, which is hereby incorporated by reference in its entirety.

TECHNICAL FIELD

The invention relates to a positioning device for mechanically actuating a component and to a method for producing a positioning device.

SUMMARY

A positioning device usually comprises an output shaft and an output wheel of a gearing that is rotatably fixed on the output shaft. Here, the output shaft is rotatably mounted so that the output shaft is rotatably driveable by way of the gearing. The gearing, the output shaft and the output wheel are arranged in a housing, wherein the output shaft penetrates the housing and is drive connectable to a component outside the housing.

Here, the bearing has an axial play which is decisive for the functioning of the positioning device. In particular, various expansions of the individual constituent parts of the positioning device as a consequence of deviating heat expansion coefficients or temperature differences can be offset by the axial play and a jamming of the output wheel in the bearing prevented. Here, the axial play is determined by the distance by which the output shaft is freely shiftable axially in the bearing.

In order to be able to determine the rotary position of the output shaft, a permanent magnet and a Hall-sensor are usually fixed to the end face of the output shaft and to the housing respectively. Here, the permanent magnet serves as transducer for the Hall-sensor that can sense the rotary position of the output shaft at a sensing distance. The distance of the output shaft with the permanent magnet to the housing and to the Hall-sensor varies as a function of the axial play of the bearing, of the heat expansion of individual constituent parts of the positioning device and of individual tolerances such as for example of manufacturing tolerances. The sensing distance of the permanent magnet to the Hall-sensor however has to lie within a close tolerance field.

Thus, the axial play on the one hand has to be large enough for avoiding the jamming of the output wheel and on the other hand small enough for sensing the rotary position of the output shaft. In order to achieve this, the axial play is precisely predetermined and can only vary in a close tolerance range. This tolerance range is composed as a tolerance chain which is defined by manufacturing tolerances of the individual constituent parts in the positioning device—such as for example of the bearing, of the output shaft, of the output wheel, of the permanent magnet.

In order to be able to adhere to the tolerance range, manufacturing tolerances of the individual constituent parts can be reduced for example. Disadvantageously, this substantially increases the manufacturing costs of the individual constituent parts and thus of the positioning device. Alternatively or additionally, the operating temperature range of the positioning device can be restricted, but which is undesirable.

The object of the invention therefore is to state an improved or at least alternative embodiment for a positioning device of this type, with which the described disadvantages are overcome. The object of the invention also is to provide a suitable method for producing the positioning device.

According to the invention, these objects are solved through the subject of the independent claims. Advantageous embodiments are subject of the dependent claims.

A positioning device according to the invention for mechanically actuating a component comprises a housing with a first housing part and with a second housing part, which are welded to one another via an axial welded connection. Here, the first housing part comprises a first integrally formed bearing point of a bearing and the second housing part comprises a second integrally formed bearing point of said bearing within the housing. In the housing, a gearing with an output shaft is fixed which penetrates the second housing part and is drive-connectable to the component outside the housing to be mechanically actuated. The gearing comprises an output wheel that is non-rotatably fixed on the output shaft, which output wheel is rotatably mounted in the bearing. The first bearing point of the bearing interacts with a first bearing surface of the output wheel and the second bearing point of the bearing interacts with a second bearing surface of the output wheel located opposite the first bearing surface axially on the end face. In addition, the bearing has a predetermined axial play which is different from zero and which is defined by a difference between an outer axial distance between the two bearing points of the bearing and an inner axial distance between the two bearing surfaces of the output wheel. Furthermore, the positioning device comprises a rotary position detector with a permanent magnet and with a Hall-sensor. Here, the Hall-sensor can be arranged on the first housing part and the permanent magnet on a gear wheel of the output shaft or on the output shaft at the end face.

The output wheel is mounted in the bearing so as to be axially shiftable by the axial play, so that the output wheel can alternately interact with the first bearing surface on the first bearing point and with the second bearing surface on the second bearing point. Here, the axial play is predetermined in such a manner that the permanent magnet of the rotary position detector is sensible by the Hall-sensor both during the interaction of the first bearing surface of the output wheel with the first bearing point and also during the interaction of the second bearing surface with the second bearing point. Furthermore, the axial play is determined in such a manner that a jamming of the output wheel in the bearing as a consequence of deviating heat expansion coefficients or temperature differences in the positioning device is avoided. The permanent magnet of the rotary position detector and the Hall-sensor can be arranged within the first bearing point of the bearing and be enclosed by the same in the circumferential direction of the output shaft.

The output wheel interacts on both sides with the respective bearing point, which in each case can comprise an end face. Both the two bearing surfaces of the output wheel and also the corresponding end faces of the bearing points can be annular, so that during the interaction of the output wheel with the respective bearing points the respective bearing surface of the output wheel lies against the end face of the respective bearing point. The axial play can be defined by a difference of the outer axial distance between the end faces of the two bearing points and of the inner axial distance between the two bearing surfaces of the output wheel.

Advantageously it can be provided that the second housing part is formed by a housing cover for closing the housing. Furthermore, the second housing part can be formed by a support, which is arranged within the housing. The first housing part and the second housing part are connected to one another by way of an axial welded connection. Radially closed, the welded connection can circulate about the output shaft between the first housing part and the second housing part.

The invention also relates to a method for producing the positioning device described above. According to the invention, the second housing part, during the welding of the second housing part to the first housing part, and the first housing part are axially adjusted relative to one another until the predetermined axial play is present in the bearing. As already explained above, the axial play is defined by a difference of the outer axial distance and of the inner axial distance in the bearing. Here, the outer axial distance is given by the distance of the two bearing points or of the end faces of the two bearing points and the inner axial distance is given by the distance of the two bearing surfaces of the output wheel relative to one another. During the welding together, the first housing part with the first integrally formed bearing point and the second housing part with the second integrally formed bearing point are axially adjusted relative to one another so that between the first bearing point in the first housing part and the second bearing point in the second housing part the outer axial distance is adjusted. Here, the adjusted outer axial distance is adjusted as a function of the inner axial distance so that the predetermined axial play in the bearing is achieved.

In particular, the predetermined axial play can be advantageously adjusted in a close tolerance range in a simplified manner, wherein manufacturing tolerances of the individual constituent parts of the positioning device—such as for example of the bearing, of the output shaft, of the output wheel or of the rotary position detector need not be reduced. The positioning device can be cost-effectively produced with the method according to the invention and the operating temperature range of the positioning device can also be advantageously retained.

In a particularly advantageous embodiment of the method according to the invention, the second housing part, after the insertion of the output shaft with the output wheel into the housing and prior to the welding of the second housing part to the first housing part, can be brought into contact with the first housing part in a welding zone provided for forming the welded connection. Prior to welding the second housing part to the first housing part, an initial axial play that is present in the bearing can then be determined. Here, the initial axial play can be preferably determined by axially moving the output shaft with the output wheel in the bearing, wherein the output wheel with the respective bearing surface is alternately moved against the stop in the form of the end face of the first bearing point or against the end face of the second bearing point. Here, the shifting of the output shaft penetrating the housing and, correspondingly the initial axial play, be measured in an optical, tactile or other manner. As a function of the initial axial play, an axial adjusting travel can then be calculated by which the second housing part and the first housing part have to be axially adjusted relative to one another during the welding in order to achieve the predetermined axial play. The adjusting travel corresponds to a difference of the initial axial play and of the predetermined axial play in the bearing. Following this, the second housing part and the first housing part can be axially adjusted relative to one another by the calculated adjusting travel during the welding. Following the adjusting of the second housing part and of the first housing part relative to one another, the second housing part and the first housing part can then be welded to one another via the axial welded connection.

Alternatively, following the insertion of the output shaft with the output wheel into the first bearing point of the first housing part and prior to the welding of the second housing part to the first housing part, a first axial distance between the second bearing surface of the output wheel and of a first precalculated welding contour can be measured. Here, the first welding contour is formed on the first housing part in a welding zone provided for forming the welded connection. Furthermore, a second axial distance between the end face of the second bearing point of the bearing and a second precalculated welding contour can be measured. Here, the second welding contour is formed on the second housing part in a welding zone provided for forming the welded connection. Defining the two axial distances can be effected in an optical, tactile or other manner. From the first axial distance, from the second axial distance and from the predetermined axial play, an axial adjusting travel can then be calculated by which the second housing part and the first housing part have to be adjusted axially relative to one another for attaining the predetermined axial play during the welding. During the welding, the second housing part and the first housing part are then axially adjusted relative to one another by the calculated adjusting travel during the welding and subsequently welded to one another via the axial welded connection.

In a further alternative procedure it is provided in the method according to the invention that following the insertion of the output shaft with the output wheel into the first bearing point of the first housing part and prior to the welding of the second housing part to the first housing part, a first axial distance between the first bearing surface of the output wheel and a first precalculated welding contour is measured. Furthermore, a second axial distance between the end face of the second bearing point of the bearing and a second precalculated welding contour and an inner axial distance between the first bearing surface and the second bearing surface of the output wheel are measured. Here, the first welding contour is formed on the first housing part and the second welding contour on the second housing part in each case in a welding zone provided for forming the welded connection. Here, the relevant variables can also be determined in an optical, tactile or other manner. From the first axial distance, from the second axial distance, from the inner axial distance and from the predetermined axial play an axial adjusting travel can then be calculated, by which the second housing part and the first housing part have to be axially adjusted relative to one another during the welding for attaining the predetermined axial play. The second housing part and the first housing part are then axially adjusted relative to one another by the calculated adjusting travel during the welding and welded to one another via the axial welded connection.

Advantageously, the welding can be effected by laser welding or by ultrasound welding or by frictional welding, preferentially vibration welding.

In the method according to the invention, the positioning device can be produced with the predetermined axial play of the bearing in a simplified manner. In particular, manufacturing tolerances of the individual constituent parts of the positioning device—such as for example of the bearing, of the output shaft, of the output wheel or of the rotary position detector need not be reduced. Furthermore, the operating temperature range of the positioning device advantageously need not be restricted either in order to avoid a jamming of the output wheel in the bearing. Because of this, the positioning device can be cost-effectively produced.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawing and are explained in more detail in the following description, wherein same reference numbers relate to same or similar or functionally same components.

It shows, in each case schematically

DETAILED DESCRIPTION

Figure 1:
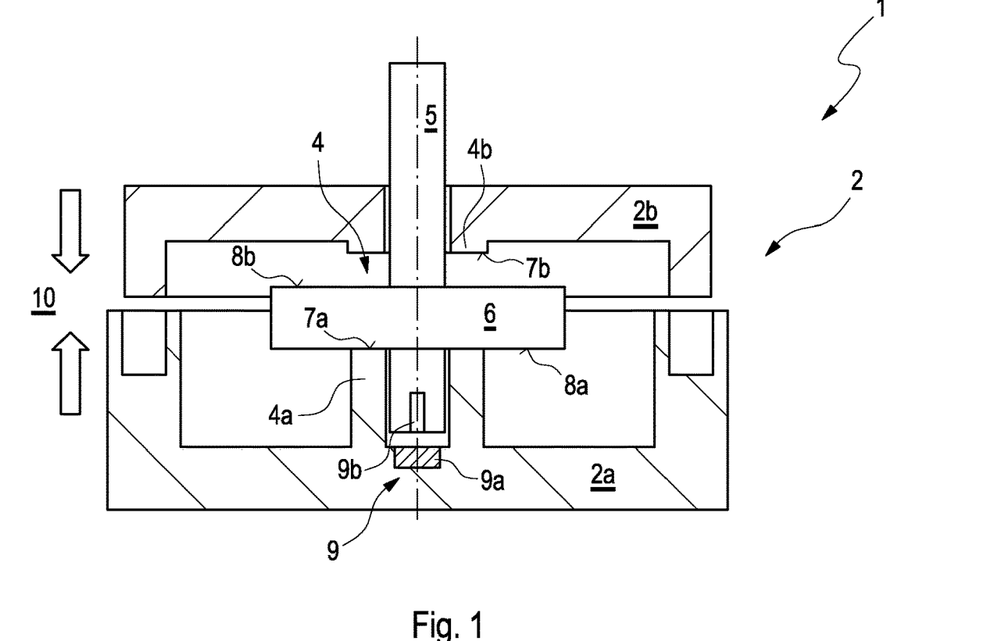
FIG. 1 a sectional view of a positioning device according to the invention for adjusting a predetermined axial play.
Figure 2:
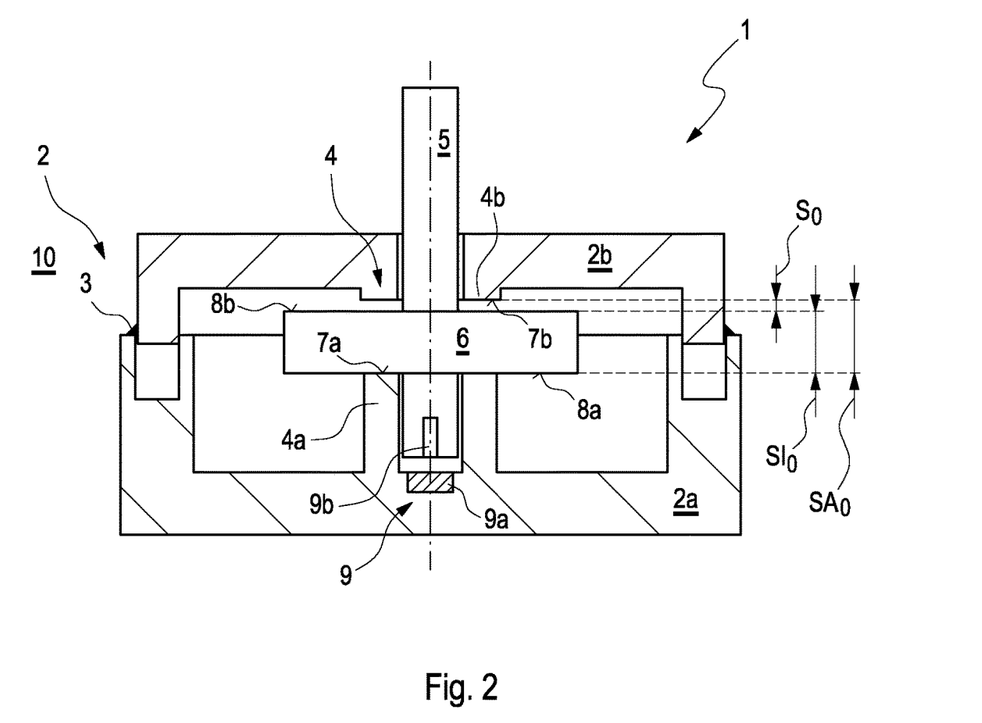
FIG. 2 a sectional view of the positioning device shown in FIG. 1 after the adjusting of the predetermined axial play.

FIG. 1 and FIG. 2 show sectional views of a positioning device 1 according to the invention prior to and after the adjusting of a predetermined axial play $S_0$, as it is shown in FIG. 2. The positioning device 1 comprises a housing 2 with a first housing part 2a and with a second housing part 2b, which in FIG. 2 are already welded together via a welded connection 3. Here, the first housing part 2a comprises a first integrally formed bearing point 4a and the second housing part 2b comprises a second integrally formed bearing point 4b, which together form a bearing 4 within the housing 2. In the housing 2, an output shaft 5 and an output wheel 6 of a gearing—not shown here—are arranged. The output wheel 6 is non-rotationally connected to the output shaft 5 so that by driving the output wheel 6 the output shaft 5 is also driveable. The output shaft 5 penetrates the second housing part 2b and is drive-connectable to a component—not shown here—outside the housing 2. Here, the output wheel 6 is rotatably mounted in the bearing 4, wherein an end face 7a of the first bearing point 4a interacts with a first bearing surface 8a of the output wheel 6 and an end face 7b of the second bearing point 4b of the bearing 4 with a second bearing surface 8b of the output wheel 6 axially at the end face—in this exemplary embodiment by lying against the same. Here, the end face 7a is arranged located opposite the end face 7b and annular in shape and the first bearing surface 8a is arranged located opposite the second bearing surface 8b and annular in shape. Furthermore, the positioning device 1 comprises a rotary position detector 9 with a Hall-sensor 9a arranged on the first housing part 2a and with a permanent magnet 9b arranged on the output shaft 5 at the end face. Here, the rotary position detector 9 is arranged within the first bearing point 4a of the bearing 4.

The output wheel 6 is mounted so as to be axially shiftable in the bearing 4 by the axial play $S_0$, as shown in FIG. 2. The predetermined axial play $S_0$ is defined by a difference between an outer axial distance $SA_0$ between the two bearing points 4a and 4b—in this exemplary embodiment also between the two end faces 7a and 7b of the two bearing points 4a and 4b of the bearing 4—and an inner axial distance $SI_0$ between the two bearing surfaces 8a and 8b of the output wheel 6. The axial play $S_0$ is predetermined in FIG. 2 in such a manner that the permanent magnet 9b of the rotary position detector 9 is sensible by the Hall-sensor 9a both when the first bearing surface 8a of the output wheel 6 lies against the end face 7a of the first bearing point 4a and also when the second bearing surface 8b of the output wheel 6 lies against the end face 7b of the second bearing point 4b. Furthermore, the axial play $S_0$ is predetermined in such a manner that a jamming of the output wheel 6 in the bearing 4 and an exceeding of the sensing range of the Hall-sensor 9a as a consequence of deviating heat expansion coefficients or temperature differences in the positioning device 1 is avoided.

The adjusting device shown in FIG. 1 and FIG. 2 can be produced in a method 10 according to the invention. Here, the second housing part 2b and the first housing part 2a are axially adjusted relative to one another during the welding of the second housing part 2b to the first housing part 2a, as indicated by arrows in FIG. 1. As soon as the predetermined axial play $S_0$ is present in the bearing 4, the second housing part 2b and the first housing part 2a are welded to one another via the axial welded connection 3, as shown in FIG. 2. Here, the first housing part 2a and the second housing part 2b can be welded to one another by laser welding or by ultrasound welding or by frictional welding—preferentially vibration welding.

Advantageously, the predetermined axial play $S_0$ in the positioning device 1 according to the invention is adjustable in a close tolerance range. Here, the positioning device 1 can be produced in a simpler and more cost-effective manner by the method 10 according to the invention. In particular, manufacturing tolerances of the individual constituent parts of the positioning device 1—such as for example of the bearing 4, of the output shaft 5, of the output wheel 6 or of the rotary position detector 9 need not be reduced. Furthermore, the positioning device 1 can be operated in a wide operating temperature range.

Figure 3:
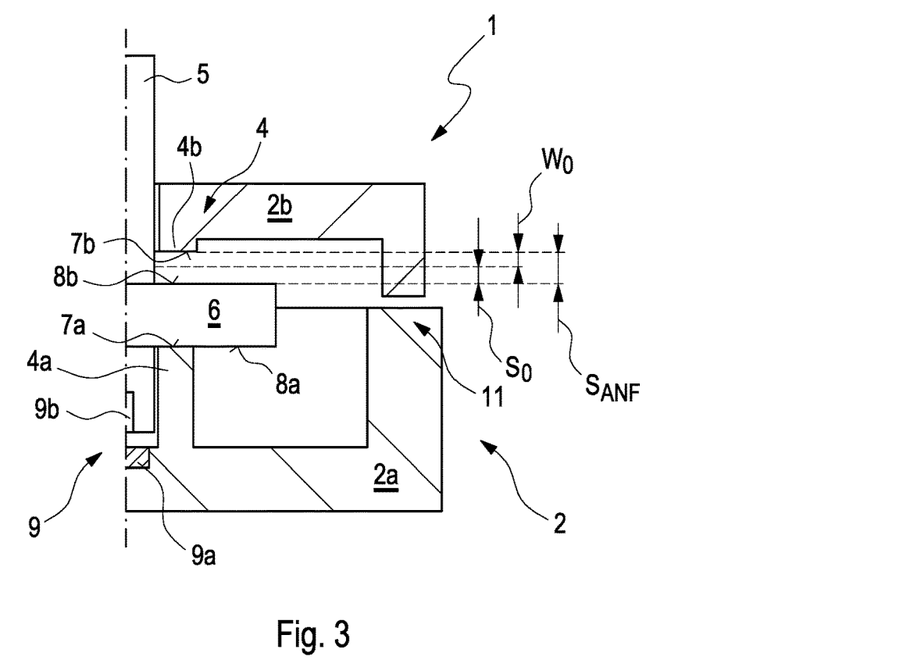
FIG. 3 to 5 sectional views of the positioning device shown in FIG. 1 and FIG. 2 with relevant variables for adjusting the predetermined axial play.
Figure 4:
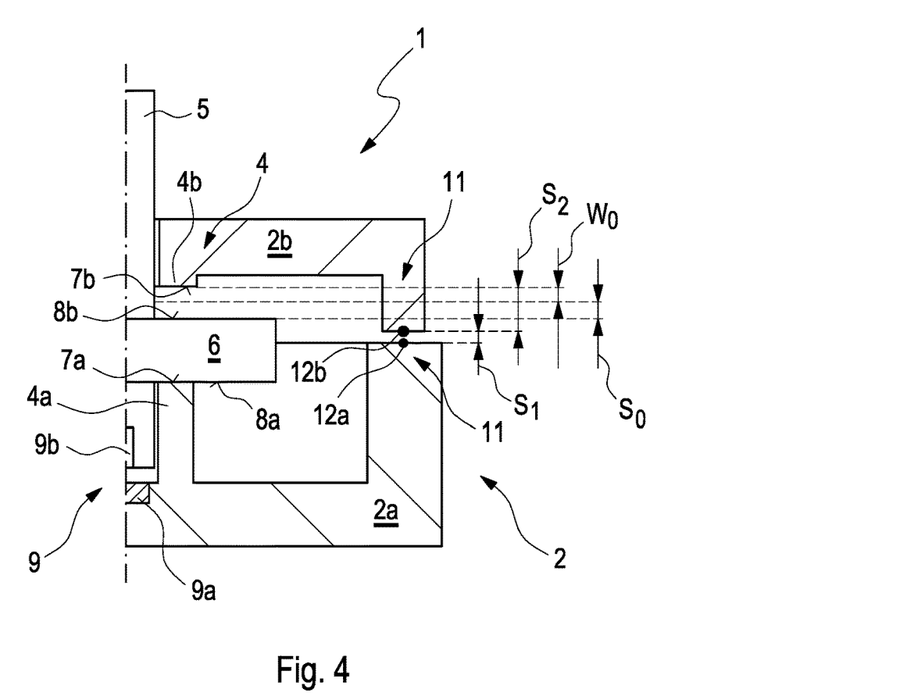
Figure 5:
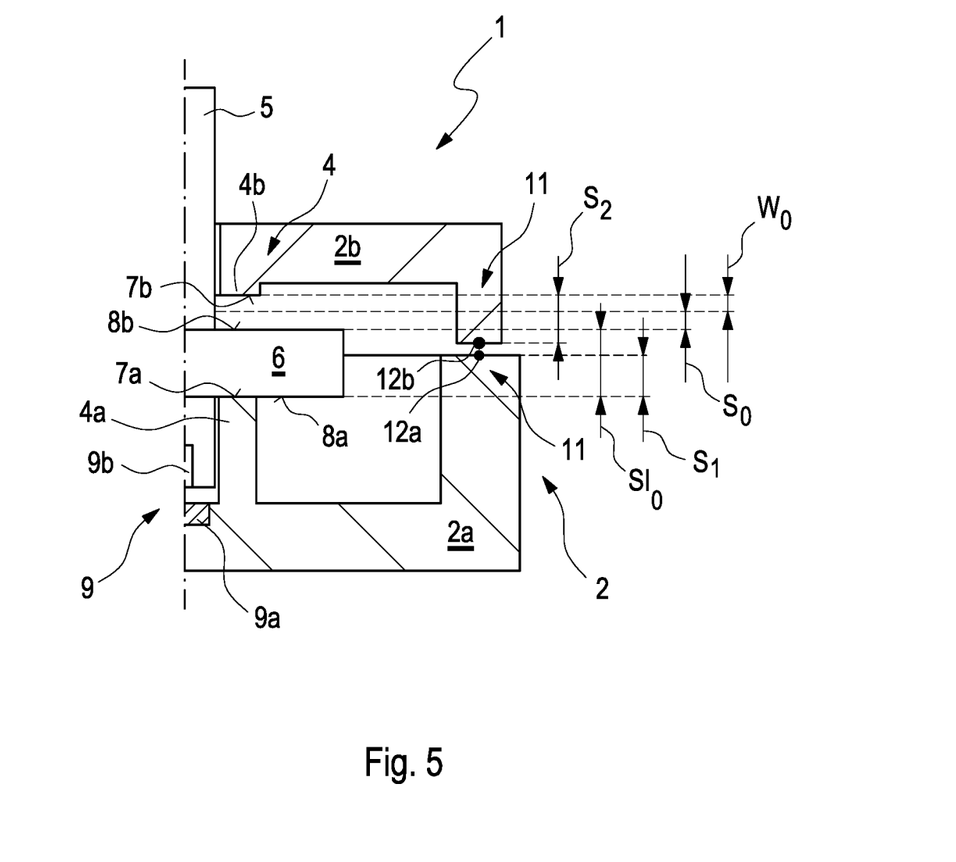

FIG. 3 to FIG. 5 show sectional views of the positioning device 1 with relevant variables for adjusting the predetermined axial play $S_0$.

In FIG. 3, relevant variable in a particularly preferred procedure for adjusting the predetermined axial play $S_0$ in the bearing 4 are shown. Here, following the insertion of the output shaft 5 with the output wheel 6 into the housing 2 and prior to the welding of the second housing part 2b to the first housing part 2a, the second housing part 2b is brought into contact with the first housing part 2a for forming a welding zone 11 provided for the welded connection 3. Prior to welding the second housing part 2b to the first housing part 2a, an initial axial play $S_{ANF}$ present in the bearing 4 is determined. This is determinable particularly easily by axially moving the output shaft 5 and the output wheel 6 in the bearing 4, wherein the output wheel 6 with the respective bearing surface 8a or 8b is alternately brought against a stop on the respective end face 7a or 7b of the respective bearing point 4a or 4b. As a function of the initial axial play $S_{ANF}$, an axial adjusting travel $W_0$ can then be calculated by which the second housing part 2b and the first housing part 2a have to be axially adjusted relative to one another for attaining the predetermined axial play $S_0$. Following this, the second housing part 2b and the first housing part 2a can be adjusted by the calculated adjusting travel $W_0$ and welded to one another via the axial welded connection 3.

In FIG. 4, relevant variables during an alternative procedure for adjusting the predetermined axial play $S_0$ in the bearing 4 are shown. Here, after the insertion of the output shaft 5 with the output wheel 6 into the first bearing point 4a of the first housing part 2a and prior to the welding of the second housing part 2b to the first housing part 2a, a first axial distance $S_1$ and a second axial distance $S_2$ are determined. Here, the first axial distance $S_1$ will be measured between the second bearing surface 8b of the output wheel 6 and a first precalculated welding contour 12a and the second axial distance $S_2$ between the end face 7b of the second bearing point 4b of the bearing 4 and a second precalculated welding contour 12b in an optical, tactile or other manner. Here, the first welding contour 12a is formed on the first housing part 2a and the second welding contour 12b on the second housing part 2b in a welding zone 11 provided for forming the welded connection 3. From the first axial distance $S_1$, from the second axial distance $S_2$ and from the predetermined axial play $S_0$, an axial adjusting travel $W_0$ can then be calculated. During the welding, the second housing part 2b and the first housing part 2a are then axially adjusted relative to one another by the calculated adjusting travel $W_0$ and can be welded to one another via the axial welded connection 3 thereafter.

In FIG. 5, relevant variables in a further alternative procedure for adjusting the predetermined axial play $S_0$ in the bearing 4 are shown. Here, following the insertion of the output shaft 5 with the output wheel 6 into the first bearing point 4a of the first housing part 2a and prior to the welding of the second housing part 2b to the first housing part 2a, a first axial distance $S_1$ and a second axial distance $S_2$ are measured. Here, the first axial distance $S_1$ is measured between the first bearing surface 8a of the output wheel 6 and a first precalculated welding contour 12a. The second axial distance $S_2$ is measured between the end face 7b of the second bearing point 4b of the bearing 4 and a second precalculated welding contour 12b. The measurement of the two axial distances $S_1$ and $S_2$ can be effected in an optical, tactile or other manner. As also in FIG. 4, the first welding contour 12a is formed on the first housing part 2a and the second welding contour 12b is formed on the second housing part 2b in a welding zone 11 provided for forming the welded connection 3. Furthermore, an inner axial distance $SI_0$ between the first bearing surface 8a and the second bearing surface 8b of the output wheel 6 is measured in a tactile, optical or other manner. From the first axial distance $S_1$, from the second axial distance $S_2$, from the inner axial distance $SI_0$ and from the predetermined axial play $S_0$, an axial adjusting travel $W_0$ can then be calculated. During the welding, the second housing part 2b and the first housing part 2a can then be axially adjusted relative to one another by the calculated adjusting travel $W_0$ and welded to one another via the axial welded connection 3.

In a method 10 according to the invention, the positioning device 1 can be produced with the predetermined axial play $S_0$ in a simplified and cost-effective manner. In particular, manufacturing tolerances of the individual constituent parts of the positioning device 1—such as for example of the bearing 4, of the output shaft 5, of the output wheel 6, of the rotary position detector 9—need not be reduced. Furthermore, the positioning device 1 can be operated in a wide operating temperature range.

The invention claimed is:

1. A positioning device for mechanically actuating a component, comprising:
a housing with a first housing part and a second housing part welded to one another via an axial welded connection, wherein the first housing part has an integrally formed first bearing point of a bearing and the second housing part has an integrally formed second bearing point of the bearing within the housing;
a gearing fixed in the housing, the gearing having an output shaft penetrating the second housing part and that is drive-connectable with the component to be mechanically actuated outside the housing, and an output wheel that is non-rotationally fixed on the output shaft and rotatably mounted in the bearing;
a rotary position detector with a permanent magnet and a Hall sensor, wherein the permanent magnet is arranged on a gear wheel of the output shaft or on the output shaft at an end face of the output shaft, and the Hall sensor is arranged on the first housing part;
wherein an end face of the first bearing point interacts axially with a first bearing surface of the output wheel, and an end face of the second bearing point interacts with a second bearing surface of the output wheel located opposite the first bearing surface; and
wherein the bearing has a predetermined axial play defined by a difference between an outer axial distance between the first and the second bearing points and an inner axial distance between the first and the second bearing surfaces.

2. The positioning device according to claim 1, wherein the permanent magnet of the rotary position detector is arranged within the first bearing point of the bearing and is enclosed by the same in the circumferential direction of the output shaft.

3. The positioning device according to claim 1, wherein the second housing part is formed by a housing cover for closing the first housing part.

4. The positioning device according to claim 1, the second housing part is formed by a support which is arranged within the first housing part.

5. The positioning device according to claim 1, wherein the welded connection between the first housing part and the second housing part circulates about the output shaft in a radially closed manner.

6. The positioning device according to claim 1, wherein at least one of:
at least one of the first bearing surface of the output wheel and an end face of the first bearing point facing the first bearing surface of the output wheel is annular; and
at least one of the second bearing surface of the output wheel and an end face of the bearing point facing the second bearing surface of the output wheel is annular.

7. A method for producing a positioning device, comprising:
fixing a gearing, which has an output shaft and an output wheel non-rotationally fixed on the output shaft, in a housing having a first housing part, which has an integrally formed first bearing point of a bearing, and a second housing part, which has an integrally formed second bearing point of the bearing, in a manner such that the output shaft penetrates the second housing part, the output wheel is rotatably mounted in the bearing, an end face of the first bearing point interacts axially with a first bearing surface of the output wheel, and an end face of the second bearing point interacts axially with a second bearing surface of the output wheel located opposite the first bearing surface;
arranging a permanent magnet of a rotary position detector on a gear wheel of the output shaft or on the output shaft at an end face of the output shaft, and a Hall sensor of the rotary position detector on the first housing part;

welding the second housing part to the first housing part via an axial welded connection; and during welding, axially adjusting the second housing part and the first housing part relative to one another until a predetermined axial play is present in the bearing, the predetermined axial play being defined by a difference between an outer axial distance between the first and the second bearing points and an inner axial difference between the first and the second bearing surfaces.

8. The method according to claim 7, further comprising:

after fixing the gearing in the housing and prior to welding the second housing part to the first housing part, bringing the second housing part into contact with the first housing part in a welding zone provided for forming the welded connection;

prior to welding the second housing part to the first housing part, determining an initial axial play present in the bearing;

calculating as a function of the initial axial play an axial adjusting travel by which the second housing part and the first housing part have to be adjusted relative to one another during welding for attaining the predetermined axial play; and during welding, axially adjusting the second housing part and the first housing part relative to one another by the calculated adjusting travel.

9. The method according to claim 7, further comprising:

after fixing the gearing in the housing and prior to welding the second housing part to the first housing part, measuring a first axial distance between the second bearing surface and a first precalculated welding contour formed on the first housing part in a welding zone provided for forming the welded connection;

measuring a second axial distance between the end face of the second bearing point and a second precalculated welding contour formed on the second housing part in the welding zone;

calculating an axial adjusting travel from the first axial distance, from the second axial distance, and from the predetermined axial play, wherein the second housing part and the first housing part have to be axially adjusted relative to one another by the axial adjustive travel during the welding for attaining the predetermined axial play; and during welding, axially adjusting the second housing part and the first housing part to one another by the calculated axial adjusting travel.

10. The method according to claim 7, further comprising after fixing the gearing in the housing and prior to welding the second housing part to the first housing part, measuring a first axial distance between the first bearing surface and a first precalculated welding contour formed on the first housing part in a welding zone provided for forming the welded connection;

measuring a second axial distance between the end face of the second bearing point and a second precalculated welding contour formed on the second housing part in the welding zone;

measuring an inner axial distance between the first bearing surface and the second bearing surface;

calculating an axial adjusting distance from the first axial distance, from the second axial distance, from the inner axial distance, and from the predetermined axial play, wherein the second housing part and the first housing part have to be axially adjusted relative to one another by the axial adjusting distance during the welding for attaining the predetermined axial play; and during welding, axially adjusting the second housing part and the first housing part relative to one another by the calculated axial adjusting travel.

11. The method according to claim 7, wherein welding is effected by one of laser welding, ultrasound welding, or frictional welding.

12. The method according to claim 11, wherein welding is effected by vibration welding.

13. The positioning device according to claim 2, wherein the second housing part is formed by a housing cover for closing the first housing part.

14. The positioning device according to claim 2, the second housing part is formed by a support arranged within the first housing part.

15. The positioning device according to claim 2, wherein the welded connection between the first housing part and the second housing part circulates about the output shaft in a radially closed manner.

16. The positioning device according to claim 6, wherein at least one of the first bearing surface of the output wheel and an end face of the first bearing point facing the first bearing surface of the output wheel is annular.

17. The positioning device according to claim 6, wherein at least one of the second bearing surface of the output wheel and an end face of the bearing point facing the second bearing surface of the output wheel is annular.

18. A positioning device for mechanically actuating a component, comprising:

a housing with a first housing part and a second housing part welded to one another via an axial welded connection, wherein the first housing part has an integrally formed first bearing point of a bearing and the second housing part has an integrally formed second bearing point of the bearing within the housing;

a gearing fixed in the housing, the gearing having an output shaft penetrating the second housing part and that is drive-connectable with the component to be mechanically actuated outside the housing, and an output wheel that is non-rotationally fixed on the output shaft and rotatably mounted in the bearing;

a rotary position detector with a permanent magnet and a Hall sensor, wherein the permanent magnet is arranged on a gear wheel of the output shaft or on the output shaft at an end face of the output shaft, and the Hall sensor is arranged on the first housing part;

wherein an end face of the first bearing point interacts axially with a first bearing surface of the output wheel, and an end face of the second bearing point interacts with a second bearing surface of the output wheel located opposite the first bearing surface;

wherein the bearing has a predetermined axial play defined by a difference between an outer axial distance between the first and the second bearing points and an inner axial distance between the first and the second bearing surfaces;

wherein at least one of the first bearing surface of the output wheel and an end face of the first bearing point facing the first bearing surface of the output wheel is annular; and wherein at least one of the second bearing surface of the output wheel and an end face of the bearing point facing the second bearing surface of the output wheel is annular.

19. The positioning device according to claim 18, wherein the permanent magnet of the rotary position detector is arranged within the first bearing point of the bearing and is enclosed by the same in the circumferential direction of the output shaft.

20. The positioning device according to claim 18, wherein the welded connection between the first housing part and the second housing part circulates about the output shaft in a radially closed manner.

* * * * *